(12) United States Patent
Dreher et al.

(10) Patent No.: US 9,174,223 B2
(45) Date of Patent: Nov. 3, 2015

(54) COMPACT SEPARATION APPARATUS

(75) Inventors: Trina Margaret Dreher, Rowville (AU); Phil Tuckett, Rowville (AU)

(73) Assignee: PROCESS GROUP PTY LTD, Rowville (AU)

( * ) Notice: Subject to any disclaimer, the term of this patent is extended or adjusted under 35 U.S.C. 154(b) by 610 days.

(21) Appl. No.: 13/584,621

(22) Filed: Aug. 13, 2012

(65) Prior Publication Data

US 2013/0048548 A1 Feb. 28, 2013

(30) Foreign Application Priority Data

Aug. 29, 2011 (AU) ................. 2011903472

(51) Int. Cl.
| | | |
|---|---|---|
| *C02F 1/24* | (2006.01) | |
| *B03D 1/24* | (2006.01) | |
| *B03D 1/14* | (2006.01) | |
| *B01D 21/24* | (2006.01) | |
| *C02F 101/32* | (2006.01) | |
| *C02F 103/36* | (2006.01) | |

(52) U.S. Cl.
CPC .......... *B03D 1/1418* (2013.01); *B01D 21/2411* (2013.01); *B03D 1/1462* (2013.01); *B03D 1/1475* (2013.01); *C02F 1/24* (2013.01); *B03D 1/1412* (2013.01); *B03D 1/247* (2013.01); *C02F 2101/32* (2013.01); *C02F 2103/365* (2013.01); *C02F 2201/001* (2013.01); *C02F 2201/008* (2013.01); *C02F 2301/024* (2013.01); *C02F 2301/026* (2013.01)

(58) Field of Classification Search
None
See application file for complete search history.

(56) References Cited

U.S. PATENT DOCUMENTS

| | | | |
|---|---|---|---|
| 3,743,102 A | | 7/1973 | Mensing et al. |
| 3,948,767 A | | 4/1976 | Chapman |
| 4,094,783 A | * | 6/1978 | Jackson .................. 210/703 |
| 4,451,366 A | | 5/1984 | Smisson |
| 4,532,034 A | | 7/1985 | Hans et al. |
| 4,940,473 A | | 7/1990 | Benham |
| 5,059,309 A | * | 10/1991 | Jordan .................... 209/164 |
| 5,928,509 A | | 7/1999 | Sugiura |
| 5,935,446 A | | 8/1999 | Weisz |
| 6,019,825 A | | 2/2000 | Greene et al. |
| 7,108,136 B2 | * | 9/2006 | Imhof ...................... 209/170 |
| 2004/0035018 A1 | | 2/2004 | Denuell et al. |
| 2007/0039894 A1 | | 2/2007 | Cort |
| 2009/0139921 A1 | | 6/2009 | Bartosek et al. |

(Continued)

FOREIGN PATENT DOCUMENTS

| | | |
|---|---|---|
| EP | 0777531 | 6/1997 |
| EP | 2263767 | 12/2010 |

(Continued)

*Primary Examiner* — Thomas M Lithgow

(57) ABSTRACT

A fluid separation apparatus for separating a fluid mixture including at least two fluids having different densities comprising a vessel having a vortex generation zone located within a fluid reservoir which includes a vortex generation wall which increases the rotational velocity of a fluid mixture flowing through the vortex generation zone and directs the fluid mixture from the fluid inlet toward the upper surface of the fluid reservoir. The vessel also includes a fluid inlet which extends into the vortex generation zone; a first fluid outlet through which the less dense fluid exits the vessel; and a second fluid outlet through which the denser fluid exits the vessel. The apparatus further comprises a gas bubble generator which introduces gas bubbles into at least a portion of the fluid mixture before the fluid mixture enters the vessel through the fluid inlet.

18 Claims, 3 Drawing Sheets

(56) References Cited

U.S. PATENT DOCUMENTS

| | | |
|---|---|---|
| 2009/0173232 A1 | 7/2009 | Folkvang |
| 2010/0006488 A1 | 1/2010 | Folkvang |
| 2010/0180768 A1 | 7/2010 | Folkvang |
| 2010/0187186 A1 | 7/2010 | Howdeshell et al. |

FOREIGN PATENT DOCUMENTS

| | | |
|---|---|---|
| FR | 2588778 | 4/1987 |
| GB | 2035150 | 6/1980 |

* cited by examiner

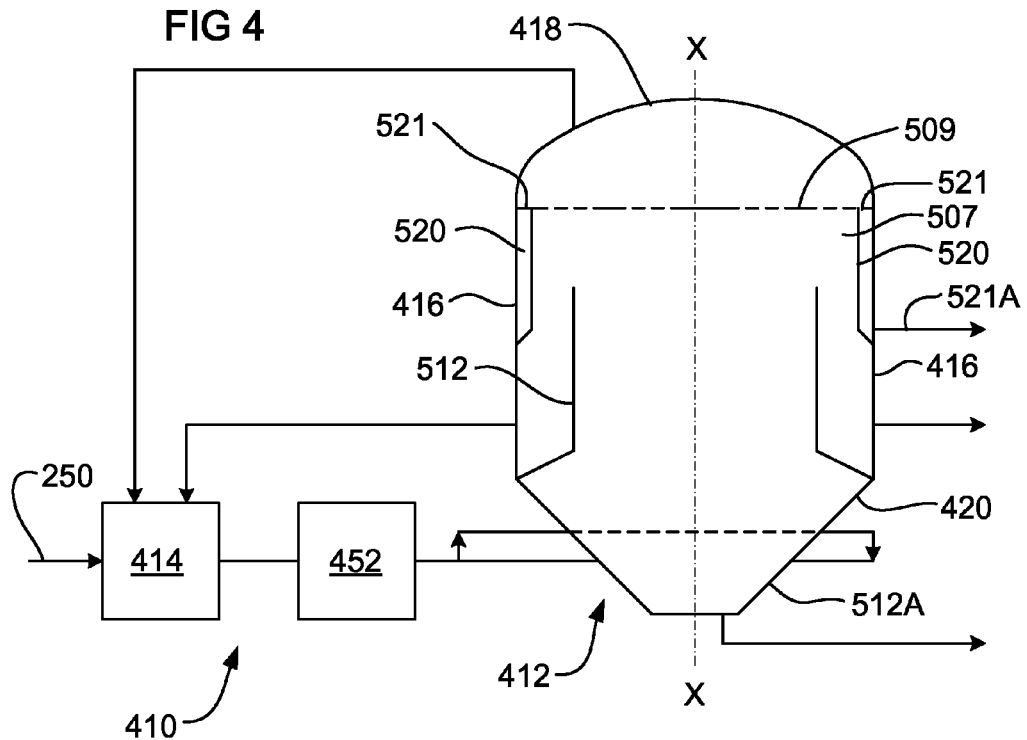
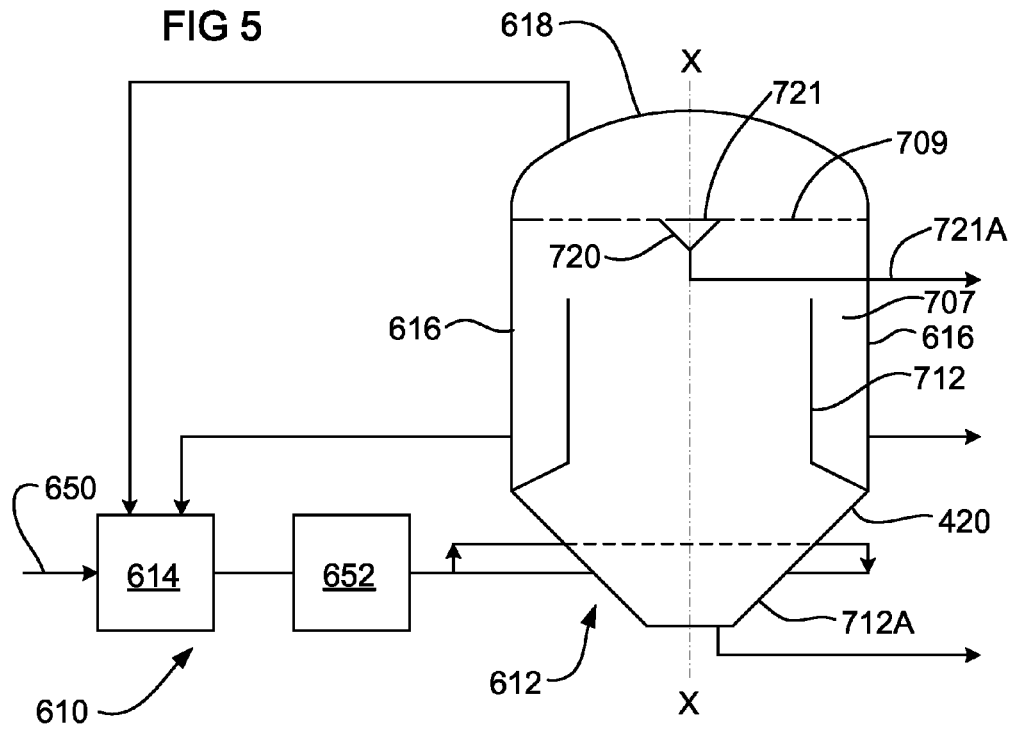

COMPACT SEPARATION APPARATUS

FIELD OF THE INVENTION

The present invention generally relates to a compact separation device for separating two or more fluids in a fluid flow. The invention is particularly applicable for separating hydrocarbons, such as oil, from a contaminated water fluid flow and it will be convenient to hereinafter disclose the invention in relation to that exemplary application. However, it is to be appreciated that the invention is not limited to that application and could be used to separate other types of fluids having different densities.

BACKGROUND OF THE INVENTION

The following discussion of the background to the invention is intended to facilitate an understanding of the invention. However, it should be appreciated that the discussion is not an acknowledgement or admission that any of the material referred to was published, known or part of the common general knowledge as at the priority date of the application.

Water remediation is an essential part of process systems in the oil and gas industry. Process water in the oil and gas industry can contain hydrocarbon contaminants such as oil. Fluid mixtures of this type, which includes components of different densities, can be separated using gas flotation technologies, such as Dissolved Gas Flotation (DGF), Induced Gas Flotation (IGF), or combinations or variations of these. Conventional gas flotation apparatus generally need to be large vertical or horizontal vessels to provide a long fluid flow path which allows the oil and water mixture to be held within the apparatus for a defined retention time. However, space is at a premium in the oil and gas industry, particularly on offshore platforms, floating vessels, and within onshore facilities. It is therefore desirable to enhance gas flotation to recover as much residual oil as possible using other means in order to reduce the size of the vessels.

In some cases, separation can be enhanced by imparting a rotational flow to the fluid mixture within the vessel. Fluid rotation can impart a centrifugal/spiral flow pattern into the fluid mixture which increases the flow path and therefore retention time within a vessel. Furthermore, with sufficient rotation, a fluid component with a lower density migrates toward a central axis of the rotational flow and a fluid with a higher density migrates toward a periphery of the rotational flow in response to centripetal and/or centrifugal forces generated by the rotational flow. This and other separation enhancements can provide more compact separation apparatus for separating the oil from water in such wastewater.

A number of compact separation vessels are currently available.

One prior compact separator is taught in International Patent Publication WO2007/049246 A2. This separator comprises a cylindrical vertical tank having an upwardly protruding conical frusta shaped wall dividing the tank into an upper section and a lower section. The upward protruding conical frusta shaped wall has at least one opening which allows communication between the upper section and the lower section of the tank. A mixed oil, water and gas fluid is introduced into the upper section of the conical frusta section through a tangentially arranged inlet. The conical frusta shaped wall in connection with the tangentially arranged inlet forces the incoming fluid to form a vortex flow in the upper section of the separator tank. The opening allows oil and gas to accumulate in the upper section of the tank and the water phase to flow downwards into the lower section of the tank.

The Applicant considers that the shape and location of the conical frusta shaped wall within the tank places unnecessary size and configuration restrictions on this separator. The location of the conical frusta shaped wall necessitates that the upper section of the tank be large enough to establish a flow path of a sufficient length to facilitate separation of oil and water, while the lower part have sufficient space to accommodate a fluid reservoir. The lower section utilises valuable space which could be used for separation.

Another prior compact separator is taught in International Patent Publication WO2008/123973A1. This separator comprises a vessel which includes one or more fluid inlets, one or more gas inlets, a vortex generation zone shaped as an inverse truncated cone, a solids collection zone, a separation zone, one or more fluid outlets, and one or more gas outlets. A fluid mixture containing two fluids of different densities is introduced into the vessel through a fluid inlet. Each fluid inlet extends into the vortex generation zone at an angle having a component tangential to an internal wall of the vortex generation zone at a point on the internal wall proximate to the fluid inlet. Gas is also introduced into the fluid in the vortex separation zone through separate gas inlets to facilitate the separation of components of the fluid mixture. The less dense fluid is compelled to agglomerate in the vortex generation zone and rise to the surface of the fluid. Flotation is aided by the gas bubbles which attach, aid and accelerate flotation of the less dense fluid to the surface. The less dense fluid coalesces at the surface and is skimmed from the fluid in the separation zone.

However, the Applicant considers that the introduction of gas bubbles via a separate fluid inlet into the vortex generation zone does not provide optimal separation. Gas bubbles introduced in this manner have a low probability of attaching to the less dense fluid and therefore provides limited separation assistance to this less dense fluid.

It would therefore be desirable to provide an alternate compact separation apparatus.

SUMMARY OF THE INVENTION

According to a first aspect of the present invention, there is provided a fluid separation apparatus for separating a fluid mixture including at least two fluids having different densities.

The apparatus includes a vessel which has a fluid reservoir and a vortex generation zone located within that fluid reservoir. The vortex generation zone includes a vortex generation wall which has at least a first tapered wall section having an angle which increases the rotational velocity of a fluid mixture flowing through the vortex generation zone. The vortex generation zone has a configuration that directs the fluid mixture from the fluid inlet toward the upper surface of the fluid reservoir. The vessel also includes at least one fluid inlet for the fluid mixture, the fluid inlet extending into the vortex generation zone at an angle having a component tangential to an internal wall of the vortex generation wall at a point on the internal wall proximate to the fluid inlet. The vessel further includes a first fluid outlet through which the less dense fluid exits the vessel. The first fluid outlet is fluidly connected to the fluid reservoir and is positioned substantially level with an upper surface of the fluid reservoir. A second fluid outlet is also provided in the vessel through which the denser fluid exits the vessel. The second fluid outlet is fluidly connected to the fluid reservoir.

The apparatus also includes a gas bubble generator which introduces gas bubbles into at least a portion of the fluid mixture before the fluid mixture enters the vessel through the fluid inlet. The gas bubbles may be introduced directly into a portion of, or substantially all of the fluid mixture or may be generated in another fluid which is mixed into the fluid mixture before the fluid mixture enters the vessel through the fluid inlet. The gas bubbles assist separation of the fluids of the fluid mixture within the fluid reservoir.

As used herein, the term "fluid mixture" encompasses, but is not limited to, mixtures of fluids, mixtures of fluids and solids, and mixtures of fluids and/or solids and/or slurries. In a preferred form, the fluid mixture includes a mixture of hydrocarbons and water, more preferably oil and water. A gas content which is entrained, dissolved or similar may also be present in the fluid mixture.

The fluid separation apparatus according to the invention has been shown to possess a favourable relationship between size and capacity. The tapered wall section of the vortex generation wall in connection with the tangentially arranged inlet forces the incoming fluid to form a vortex flow, preferably an upwardly spiralling vortex, in the vortex generation zone. This vortex flow promotes the flotation and phase separation of the fluid mixture in the separator, thereby resulting in an efficient separation of the different density fluids in the fluid mixture. Separation is further aided by the gas bubbles introduced into the fluid mixture by the gas bubble generator and fed into the inlet of the vessel. The gas bubbles can accelerate the Stoke's Law effect of oil and water separation.

The vortex generation wall promotes oil/water separation by extending the length of the flow path within the liquid reservoir of the vessel. The configuration of the vortex generation wall is intended to minimise short-circuit flow of oily water through the liquid reservoir that may otherwise lead to poor outlet water quality (i.e. high oil content). The first wall section can have any suitable configuration. In some forms, the wall comprises a planar surface.

However, it is preferred that the wall, and in particular the first section, extends around the internal periphery of the vessel, thereby forming a closed housing within the fluid reservoir. Where the vessel has a circular cross-section, it is preferred that the vortex generation wall and the first wall section extend annularly within that cross-section. Whilst any suitable shape can be used for the first wall section, it is preferred that the first wall section of the vortex generation wall has an inverted substantially frustoconical shape.

The vessel typically includes a central vertical axis. To assist in vortex generation, the first wall section of the vortex generation wall preferably comprises an angle ranging from 1 to 70 degrees from a vertical axis, and more preferably between 10 and 50 degrees from the vertical axis.

The vortex generation wall can include a number of sections, thereby creating a shaped housing or enclosure within the fluid reservoir of the vessel. These sections can have a tapered configuration, planar configuration, annular configuration, irregular configuration or combinations thereof.

For example, the vortex generation wall may further include a second wall section located between the first wall section and the upper surface of the fluid reservoir. In one embodiment, the second wall section has an upright substantially frustoconical shape. However, it should be appreciated that other configurations, such as cylindrical, truncated spherical or similar could equally be used.

The vortex generation wall may also further include a third wall section located between the second wall section and the upper surface of the fluid reservoir. In one embodiment, the third wall section has a substantially cylindrical shape. Again, it should be appreciated that other configurations, such as conical, frustoconical, truncated spherical or similar could equally be used.

Where the vortex generation wall includes more than one section, the fluid inlet is preferably located in the first wall section of the vortex generation zone. The vessel may also include any number of fluid inlets in fluid communication with the vortex generation zone. Preferred embodiments include two or more fluid inlets in fluid communication with the vortex generation zone. The fluid inlets are preferably substantially evenly spaced about a periphery of the vortex generation zone.

The fluid reservoir of the vessel extends between an upper surface and a base. It is preferred that at least one section of the vortex generation wall forms at least part of, and more preferably a substantial part of, the base of the fluid reservoir of the vessel. In some embodiments, the base of the vessel can comprise or be closely associated with at least one section of the vortex generation wall. In other embodiments, further sections or chambers can be provided below or outside of the fluid reservoir.

The vortex generation wall can define an enclosed body within the fluid reservoir of the vessel. In some embodiments, this body can be used to fluidly seal and segregate sections of the vessel. For example, in some embodiments at least one section of the vortex generation wall (the peripheral sealing section) forms a fluid seal with an inner wall of the vessel, thereby defining an upper chamber and a lower chamber within the vessel separated by the vortex generation wall. The section of the vortex generation wall that forms a fluid seal with an inner wall of the vessel is preferably a peripheral section of the vortex generation wall.

Where the vortex generation wall includes a second wall section, the peripheral sealing section of the vortex generation wall can be located at or generally about the connection or connecting section between the first wall section and second wall section of the vortex generation wall. The connection or connecting section can be a discrete join between the first and second wall sections, or may be a larger section which links the first and second wall sections. For example, the first and second wall sections may be separated by a cylindrical connection section in some embodiments which axially spaces the wall sections apart relative to the central vertical axis of the vessel. However, it should be appreciated that in other embodiments, that fluid seal may be formed with any other sections of the vortex generation wall.

This peripheral seal can be used to form fluidly segregated or separated sections within the vessel. For example, the lower chamber can be configured to be fluidly separated from the upper chamber and/or fluid reservoir, and be in fluid communication with the fluid reservoir through the first fluid outlet. Fluid communication may be achieved by any suitable means. Fluid collected in the lower chamber preferably exits the lower chamber through at least one further outlet. Other outlets may also be provided for gas egress and/or other fluid overflow.

The upper chamber can include a gas/vapour space located between the upper surface of the fluid reservoir and the top of the vessel. The vapour space may include an outlet where any gas or vapour can flow out from that gas/vapour space. In some forms, the gas/vapour space is fluidly connected to the lower chamber, and more preferably a gas/vapour space of the lower chamber, as a way of equalising pressure between the upper and lower chambers of the vessel. In some instances, a blanket gas, such as a hydrocarbon gas, nitrogen, air or similar may be introduced into one or each of the gas/vapour spaces. In this configuration, the upper chamber may also be fluidly separated from the fluid reservoir or conversely fluidly connected to the fluid reservoir. For the purposes of flotation separation, it is preferred that the upper chamber is fluidly connected to, and more preferably contains the fluid reservoir.

The first fluid outlet can be any enclosure or body that is fluidly connected to the fluid reservoir and is positioned substantially level with an upper surface of the fluid reservoir. In one preferred form, the first fluid outlet includes a central receptacle. The central receptacle may comprise a well or other enclosure into which fluid from the upper surface of the fluid reservoir may drain. In some embodiments, the central receptacle includes a central conduit which extends from the upper surface of the fluid reservoir and through the fluid reservoir of the vessel, preferably to the base of the fluid reservoir. The inlet of the central conduit can have any suitable configuration, but is preferably an elongate pipe. In some embodiments, the inlet of the central receptacle has a substantially flat edge, a serrated upper portion or a conical upper portion. In other embodiments, the first fluid outlet includes an annular chamber extending substantially around the inner side of the vessel.

The first fluid outlet may be fluidly connected to another chamber of the vessel, or may direct fluid to another process vessel, for example, a separate oil surge tank or collection tank. In those embodiments with an upper and lower chamber, the first fluid outlet fluidly connects the upper and lower chambers. The lower chamber may be configured as a surge tank.

The second fluid outlet is fluidly connected to the fluid reservoir and may be located at any suitable position in the vessel. In some embodiments, the second fluid outlet is located between the upper surface of the fluid reservoir and the fluid inlet. In a preferred embodiment, the second fluid outlet is located outside of the vortex generation zone of the fluid reservoir. More preferably, the second fluid outlet is located in the fluid reservoir between the fluid inlet and the top of the vortex generation wall of the vortex generation zone.

The vortex generation wall can be located in any suitable location within the fluid reservoir. To aid separation, it is preferred that the top of the vortex generation wall is located below the upper surface of the fluid reservoir. A separation zone may be provided within that part of the fluid reservoir, external to the vortex generation zone but still in fluid communication with the vortex generation zone. The separation zone can have a number of fluidly connected zones. A primary separation zone can be formed between the top of the vortex generation wall and the upper surface of the fluid reservoir. Other sections of the separation zone (secondary, tertiary or the like) can be formed in those areas of the fluid reservoir outside of the vortex generation zone which are fluidly connected to the primary separation zone. These separation zones are preferably configured to dampen the effects of the vortex created in the vortex generation zone, to allow the fluids to separate and move towards the respective fluid outlets.

The gas bubble generator can be any suitable apparatus capable of introducing bubbles of gas within a fluid flow. The gas bubble generator may include, but is not limited to, a pump and eductor, electrolytic cell, nozzle and pressure drop to allow dissolved gas to flash out of solution. In one preferred embodiment, the gas bubble generator includes at least one eductor. The mixing and shearing effect of an eductor produces a fine gas bubble distribution within the fluid flow.

It is preferred that the gas bubbles introduced within a fluid flow are microbubbles to produce fine bubble dispersion within the vortex generation zone. The microbubbles preferably have a diameter of less than or equal to 150 micron, and more preferably have an diameter of between 25 to 100 micron. The gas bubble generator preferably uses gas from the gas/vapour space of the upper chamber to introduce gas bubbles within the inlet flow of the vessel. In some embodiments, the gas bubble generator generates bubbles in a recycle fluid stream which is in fluid communication with the fluid reservoir of the vessel. The bubble generator produces a gas entrained fluid which is mixed with the fluid mixture being fed into the inlet of the vessel. The recycle fluid stream can recycle between 5 to 30%, and more preferably between 10 to 15% of fluid from the fluid reservoir through the gas bubble generator. Whilst any portion of the fluid reservoir can be used, it is preferred that the recycle fluid stream is a purified (low oil concentration) water stream.

The fluids in the fluid mixture can comprise any suitable fluids. In a preferred embodiment, the fluid mixture includes water and one or more hydrocarbons.

According to a second aspect of the present invention, there is provided a method of separating a fluid mixture comprising:

introducing a fine dispersion of gas bubbles into a fluid mixture having a first component and a second component, the first component having a higher density than the density of the second component, to produce an entrained gas fluid mixture;

introducing the entrained gas fluid mixture through at least one fluid inlet into a vortex generation zone within a vessel, the vortex generation zone being enclosed within a vortex generation wall which includes at least a first tapered wall section having an angle selected to increase a rotational velocity of a fluid mixture flowing through the vortex generation zone, the entrained gas fluid mixture being introduced through the fluid inlet in a direction tangential to an internal wall of the vortex generation zone proximate the fluid inlet;

inducing upward rotational flow of the fluid mixture in the vortex generation zone primarily through vortex generation of the entrained gas fluid entering the vortex generation zone from the fluid inlet or inlets;

releasing the upward rotational flow of the fluid mixture to form a first zone comprising the fluid mixture rich in the first component and a second zone comprising the fluid mixture rich in the second component; and discharging at least a portion of the fluid mixture rich in the first component from a first fluid outlet of the vessel.

The first component and second component can comprise any suitable fluids. In a preferred embodiment, the first component comprises water and the second component comprises a hydrocarbon.

The step of introducing a fine dispersion of gas bubbles into a fluid mixture may include the steps of:

discharging from the second zone a recycle fluid comprising at least a portion of the fluid mixture rich in the second component introducing a fine dispersion of gas bubbles into the recycle fluid to form a gas entrained recycle fluid;

mixing the gas entrained recycle fluid with the fluid mixture having a first component and a second component, to produce an entrained gas fluid mixture.

The step of introducing a fine dispersion of gas bubbles into the recycle fluid is preferably conducted in a gas bubble generator.

In a preferred embodiment, the method of the second aspect of the invention is undertaken using a fluid separation apparatus according to the first aspect of the present invention.

BRIEF DESCRIPTION OF THE DRAWINGS

The present invention will now be described with reference to the figures of the accompanying drawings which illustrate particular preferred embodiments of the present invention, wherein:

FIG. 4 provides a schematic diagram of a compact separation apparatus including a separation vessel and gas bubble generation device according to a third embodiment of the present invention.

FIG. 5 provides a schematic diagram of a compact separation apparatus including a separation vessel and gas bubble generation device according to a fourth embodiment of the present invention.

DETAILED DESCRIPTION

FIGS. 1 to 5 illustrates four different embodiments of a separation apparatus 10, 210, 410, 610 of the present invention which are used to substantially separate a hydrocarbon contaminated water mixture into the constituent water and hydrocarbon components.

Figure 1:
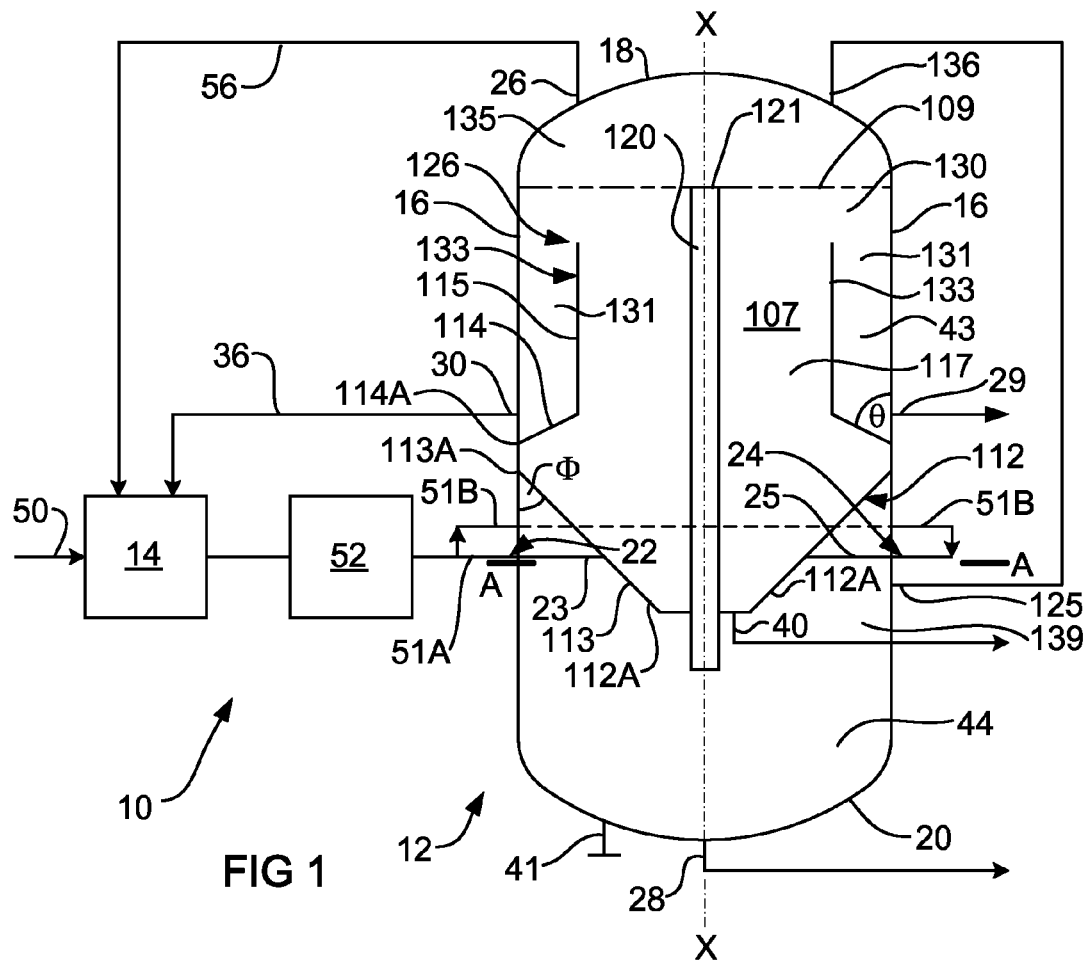
FIG. 1 provides a schematic diagram of a compact separation apparatus including a separation vessel and gas bubble generation device according to a first embodiment of the present invention.
Figure 2:
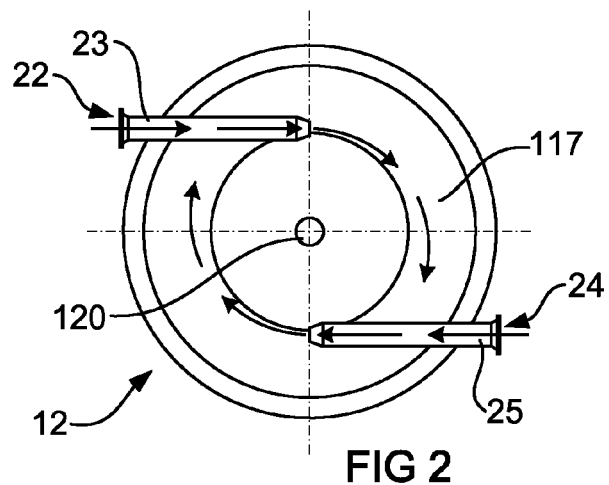
FIG. 2 provides a horizontal cross-sectional view of the separation vessel along section A-A of FIG. 1.

Firstly referring to the separation apparatus 10 shown in FIGS. 1 and 2, it can be seen that this first embodiment of separation apparatus 10 generally includes a separation vessel 12 and a bubble generation device 14.

The separation vessel 12 is a vertically orientated cylindrical vessel having planar side walls 16, a curved upper wall 18, and a curved bottom wall 20. However, it should be appreciated that the vessel 12 may be any size and shape suitable for a particular purpose. The separation vessel 12 includes two fluid inlets 22 and 24 in the side walls 16, an upper gas outlet 26 located in the upper wall 18 and a lower oil outlet 28 located in the bottom wall 20. The separation vessel 12 also includes a side water outlet 29 and a recycle fluid outlet 30 located in the side walls 16. Two drainage outlets 40 and 41 are also provided which allow an upper compartment 43 and a lower compartment 44 of the vessel 12 to be drained of fluid. As will be described in more detail below, each of the upper compartment 43 and the lower compartment 44 are fluidly separate. The respective inlets and outlets may take shapes and forms of any fluid outlets known in the art.

The bubble generation device 14 can comprise any apparatus capable of generating bubbles, preferably microbubbles in a fluid. In the illustrated apparatus 10, the bubble generation device 14 includes at least one eductor (not illustrated) for introducing gas bubbles into a fluid fed therethrough. The bubble generation device 14 is fluidly connected to inlet stream 50, gas outlet stream 56 and fluid recycle stream 36. Recycle fluid, preferably purified water (typically including residual oil content) is extracted from the vessel 12 through fluid recycle outlet 30 and pumped to the bubble generation device 14. The eductor(s) introduce a fine dispersion of gas bubbles, preferably microbubbles, into this recycle fluid. Between 10 to 15% of the purified water is recycled through the bubble generation device 14. Gas used in the bubble generation device 14 is recycled from the gas outlet 26 of the vessel 12. The gas enriched recycle fluid is mixed with the inlet stream 50 prior to being fed into the vessel 12.

The separation vessel 12 illustrated in FIG. 1 contains a fluid reservoir 107 and an internal baffle or wall structure, which for the purposes of this specification is termed a "vortex generation wall" 112. The vortex generation wall is located within the fluid reservoir 107 of the vessel 12. The fluid reservoir 107 of the vessel 12 extends from a base 112A of the vortex generation wall 112 to an upper surface 109 located in a top part of the vessel 12.

It is to be understood that the term "vortex generation wall" means a wall which is angled with respect to a vertical axis (in this case central vertical axis X-X of the vessel 12) for at least one portion of the wall 112.

The vortex generation wall 112 of the illustrated embodiment is formed from three distinct wall sections, being a first wall section 113, a second wall section 114 and a third wall section 115. The first wall section 113 has inverted frustoconical shape having a cross sectional diameter larger at an upper end than a cross sectional diameter at lower end. The first wall section 113 forms the base 112A of the fluid reservoir 107 in the vessel 12. The second wall section 114 is located between the first wall section 113 and the upper surface 109 of the fluid reservoir 107. The second wall section 114 has an upright frustoconical shape having a cross sectional diameter which is smaller at an upper end than a cross sectional diameter at lower end. The third wall section 115 is located between the second wall section 114 and the upper surface of the fluid reservoir 107. The third wall section 115 has a substantially cylindrical shape having a cross sectional diameter which is substantially the same as the cross sectional diameter of the upper end of the second wall section 114.

The taper $\phi$ of the first wall section 113 of the vortex generation wall 112 generally has an angle between 20 and 50 degrees from vertical and is selected to provide a rotational fluid velocity within a vortex generation zone 117 enclosed within the walls of the vortex generation wall 112 sufficient to separate fluid components to a desired degree for a particular fluid throughput. The taper $\theta$ of the second wall section 114 of the vortex generation wall 112 has generally the same angle as the first wall section 113, being between 20 and 50 degrees from vertical. This taper $\theta$ is also selected to provide a rotational fluid velocity within the vortex generation zone 117 sufficient to separate fluid components to a desired degree for a particular fluid throughput.

The overall shape and volume of the vortex generation wall 112 can vary in dimensions and is selected based upon factors such as the type and expected composition of fluid mixture to be separated, the desired throughput, and/or desired overall footprint of the separation apparatus 10. In many instances, a higher throughput and a smaller footprint are desired.

The overall height of vortex generation wall 112 (the combination of the first 113, second 114 and third wall 115 sections and any connection section between these sections) is selected to provide desired residence time of a fluid mixture in the vortex generation zone 117 of the wall 112 and/or a desired amount of separation of components of a fluid mixture introduced into vortex generation zone 117.

The vortex generation wall 112 facilitates separation of the oil and water components of the inlet fluid mixture through vortex generation driven by the shape of the vortex generation wall 112 and velocity of the fluid introduced through the fluid inlets 22 and 24. The two fluid inlets 22 and 24 of the vessel 12 extend via inlet pipes 23 and 25 into the vortex generation zone 117. As best illustrated in FIG. 2, that inlet pipes 23 and 25 are located and angled to introduce fluid into the vortex generation zone 117 at an angle having a vector component tangential to an internal wall of the vortex generation zone 117 at a point on the internal wall proximate the fluid inlets 22 and 24. The tangential angle of introduction assists the fluid mixture attaining a certain rotational velocity which increases as the fluid mixture rises through the vortex generation zone 117 as the cross sectional area or diameter of the vortex generation zone 117 becomes smaller. The rotational flow induces less dense components of the fluid mixture to migrate toward the centre of the vortex generation zone 117 (towards axis X-X) and denser components to migrate toward the vortex generation wall 112 due to the action of centripetal and/or centrifugal force.

The vortex generation wall 112 defines an enclosed body within the fluid reservoir 107 of the vessel 12 which fluidly seals and segregates sections of the vessel 12. The upper end 113A of the first wall section 113 of the vortex generation wall 112 and the lower end 114A of the second wall section 114 of the vortex generation wall 112 are fixed around the periphery of an inner wall of the vessel 12 and form a fluid seal therewith. This defines an upper chamber 43 and a lower chamber 44 within the vessel 12 separated by the vortex generation wall 112. The points 113A and 114A at which the upper end of the first wall section 113 of the vortex generation wall 112 and the lower end of the second wall section 114 of the vortex generation wall 112 is fixed around the periphery of an inner wall of the vessel 12 are vertically spaced apart relative to the vessel's central axis X-X, such that the first and second wall sections 113, 114 are separated by a cylindrical connection section which axially spaces the two frustoconical wall sections apart relative to the central vertical axis X-X of the vessel 12. However, it should be appreciated that in other embodiments, that points 113A and 114A may be separated by other shapes or configurations, or may overlap/correspond.

The lower chamber 44 is fluidly separated from the fluid reservoir 107 by the vortex generation wall 112. The lower chamber 44 is in fluid communication with the upper chamber 43 and fluid reservoir 107 through a first fluid outlet which comprises a central elongate pipe 120 which extends between the upper surface 109 of the fluid reservoir 107 and the lower chamber 44 along the central axis X-X. The pipe 120 includes an inlet 121 which has a serrated upper portion 122. Oil collected in the lower chamber 44 exits the lower chamber through oil outlet 28. Other outlets such as drainage outlet 41 and gas outlet 125 are also provided.

The upper chamber 43 includes the fluid reservoir 107. Each of the water outlet 29 and fluid recycle outlet 30 are located in the upper chamber 43, outside of the vortex generation zone 117 between the fluid inlets 22 and 24 and the top 126 of the vortex generation wall 112.

The top 126 of the vortex generation wall 112 is located below the upper surface 109 of the fluid reservoir 107. A separation zone 130 is provided within the fluid reservoir 107 of the vessel 12 between the top 126 and sides 133 of the vortex generation wall 112 and the upper surface 109 of the fluid reservoir 107 in the upper chamber 43 of the vessel 12. The separation zone 130 is configured to dampen the effects of a vortex created in the vortex generation zone 117, so as to allow the fluids to separate and move towards the respective fluid outlets 29, 30, 121. The size of the separation zone 130 may be selected to provide a desired residence time for fluid in the separation zone 130.

The separation zone 130 may include baffles, coalescers or the like (not illustrated) to enhance phase separation and minimise oil entrainment in discharge water.

The second wall section 114 and third wall section 115 separate the vortex generation zone 117 in the upper chamber 43 from the separation zone 130. A primary section of the separation zone 130 is located between the top 126 of the vortex generation wall 112 and the upper surface 109 of the fluid reservoir 107 in the upper chamber 43 of the vessel 12. A trough shaped settling area 131 (or secondary separation zone) of the separation zone 130 is provided between the outer side walls 133 of each of the second wall section 114 and third wall section 115 and the side walls 16 of the vessel 12. A purified water component of the separated mixed fluid generally collects in this settling area 131. It should be appreciated that residual oil content may still be present in the purified water component. Both the side water outlet 29 and recycle fluid outlet are fluidly connected with the settling area 131.

The upper chamber 43 includes a gas/vapour space 135 located between the upper surface 109 of the fluid reservoir 107 and a top 18 of the vessel 12. The vapour space 135 includes two gas outlets 26, 136. The first (gas recycle) outlet 26 is fluidly connected to the bubble generation device 14 described previously. The second (equalising gas) outlet 136 is fluidly connected to another gas outlet 125 fluidly connected via a conduit 140 to the lower chamber 44 of the vessel 12. The lower chamber 44 also includes a gas/vapour space 139 in the upper portions thereof. The fluid connection 140 between each of these respective gas/vapour spaces 135 and 139 equalises pressure between the upper 43 and lower 44 chambers of the vessel 12. In some instances a blanket gas, such as a hydrocarbon gas, nitrogen, air or similar may be introduced into one or each of the gas/vapour spaces 135, 139.

As outlined earlier, the apparatus 10 also includes a bubble generation device 14 which introduces a large number of small gas bubbles, preferably microbubbles, into a recycle purified water which is mixed into the fluid mixture prior to this gas enriched fluid mixture being introduced into the vortex generation zone of the vessel 12. The bubble generation device 14 is fed gas from the vapour space 135 of the vessel 12 via gas outlet 26 and purified water from the upper chamber 43 via recycle fluid outlet 30.

The bubbles are used to accelerate the Stoke's Law effect of oil and water separation. The gas bubbles may contact one or more components of the fluid mixture, and adhere to one of the components, namely oil droplets, thereby facilitating upward movement of the oil droplets relative to the water content, in some instances by altering the effective density of these components. This may facilitate separation of the components of the fluid mixture. The bubble size directly affects the bubble drag coefficient, which in turn affects the rising velocity of the bubbles. As the gas bubbles rise through the water stream they may contact and attach to entrained oil droplets present in the water, which accelerates the oil droplet's assent to the surface.

It is important to note that the introduction of large gas bubbles (>1.0 mm) into the fluid stream has no benefit to the separation of oil from the inlet fluid stream. Furthermore, introducing large gas bubbles into the inlet stream can have a detrimental effect on the separation of oil. This occurs as the density difference between the large gas bubbles and the fluid stream is so large that these bubbles have a very high buoyancy coefficient, and this causes them to rise very rapidly to the surface. This creates significant turbulence, which can adversely effect the natural settling velocity of smaller oil droplets and gas bubbles.

Small, but not too small, bubbles are desired as large bubbles rise too fast to attach to the oil droplets, induce turbulence as they rise, and can induce foaming at the surface, all of which decrease oil/water separation efficiency. The bubbles are preferably microbubbles having a diameter of between 25 to 100 micron. It is desired to minimise the amount of gas added to the incoming water stream and to maximise the number of gas bubbles dispersed in the water stream so that the majority of the gas bubbles are <100 micron in diameter, and many are <50 micron in diameter. It is known that these microbubbles are of a similar size to the oil droplets which they are required to come into contact with. Being a smaller size, the microbubbles will rise more slowly to the liquid surface and have more time to contact and absorb the oil droplets. However, if the gas bubbles are too small (<5 micron) they will take too long to migrate to the liquid surface and thereby require a long residence time and larger separation vessel to achieve the required oil and water separation.

It is to be understood that the separation apparatus according to the present invention can be used with other methods of gas bubble generation, including use as a dissolved gas flotation (DGF) unit where gas is flashed from the oily water via a pressure reduction.

In operation, process water containing hydrocarbon contaminants such as oil from an upstream process operation (for example one or more hydrocyclones) is fed into the vessel 12 through inlet stream 50. Inlet stream 50 splits into inlet streams 51A and 51B which are fluidly connected to the fluid inlets 22 and 24 of the vessel 12. A gas bubble containing fluid stream is mixed into each of streams 51A and 51B, resulting in a bubble enriched stream which passes through an optional mixing device 52 and is then fed into the separation vessel 12 through the fluid inlets 22 and 24.

The bubble enriched fluid mixture flow through fluid inlets 22, 24 into the vortex generation zone 117 at an angle that has a component tangential to the internal wall of the vortex generation zone 117 proximate the position of fluid introduction. While not illustrated, it should be appreciated that this induces a spiral upward flow of the fluid in the vortex generation zone 117 causing the fluid to spiral in an upward path through vortex generation zone 117 and then into separation zone 130 above and beside vortex generation zone 117.

The fluid mixture introduced into the vortex generation zone 117 flows rotationally upwards through the vortex generation zone 117 at a rate of between 0.01 and 0.1 m/s, typically about 0.04 m/s. As the fluid mixture flows rotationally in the vortex generation zone, components in the fluid mixture with a lower density relative to other components may migrate toward a central vertical axis X-X of the vortex generation zone 117 while more dense components migrate toward the vortex generation wall 112, due to the action of centripetal and/or centrifugal force. Again, the bubbles entrained in the fluid accelerate the Stoke's Law effect of oil and water separation.

In the separation zone 130, the rotational velocity of the fluid mixture may decrease due to friction, due to an increased cross sectional area of the separation zone 130 in comparison to the vortex generation zone 117. Hydrocarbons (the less dense component or components of the fluid mixture) tend to float upward through the separation zone 130 and towards the central axis X-X and outlet 121. The water rich fluid mixture (the denser component) moves downwardly through the separation zone 130 between vortex generation wall 112 and vessel wall 102 for removal through the water outlet 29 and fluid recycle outlet 30.

The hydrocarbon component(s) of the fluid mixture float upward through the separation zone 130, to the upper surface 109 of the fluid reservoir 107 and migrate toward fluid outlet 121. This fluid then flows downwardly through the elongate pipe 120 into the lower chamber 44. The lower chamber 44 acts as a small surge tank. The hydrocarbon component(s) is then removed from the lower chamber 44 via the oil outlet 28 and flows to one or more recovery pumps, or other collection vessel (not illustrated).

The gas bubbles in the fluid mixture also rise through the separation zone 130, to the upper surface 109 of the fluid reservoir 107. The gas bubbles disengage from the hydrocarbon component(s) and escape the fluid reservoir 107 into the gas/vapour space 135 in the upper chamber 43. Gas is evacuated from the top of the vessel (vapour space) via the gas outlet 26 and recycled via stream 56 to the eductors (not illustrated) of the bubble generation device 14 to mix with a recycle portion of fluid extracted from the vessel 12 from the recycle fluid outlet 30. The bubble generation device 14 produces a fine gas bubble distribution in the recycled stream which is fed into inlet streams 51A and 51B. Recycling of the gas reduces consumption of the blanket gas within the vessel 12, while excess gas may be vented.

Figure 3:
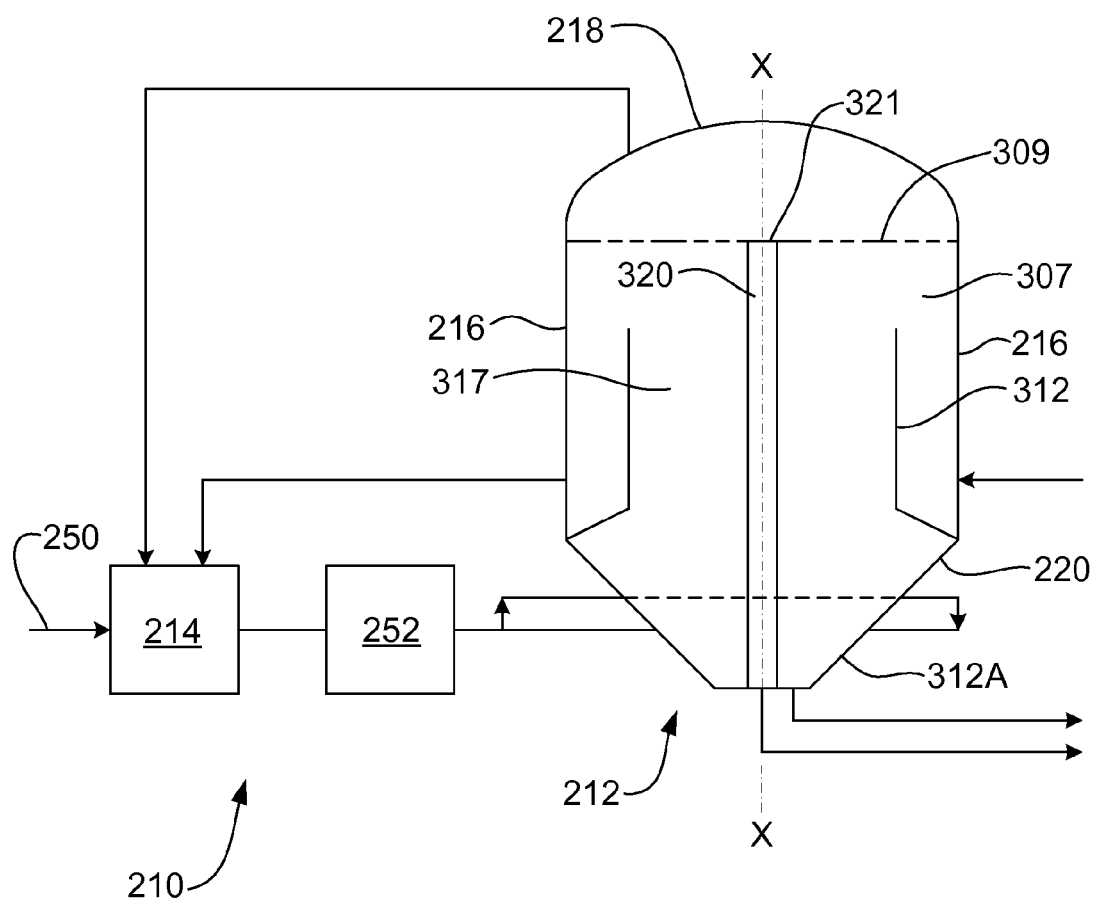
FIG. 3 provides a schematic diagram of a compact separation apparatus including a separation vessel and gas bubble generation device according to a second embodiment of the present invention.

FIGS. 3, 4 and 5 illustrate variations of the separation device 10 illustrated and described in relation to FIG. 1. It should be understood that the preceding description equally applies to each of the separation devices 210, 410 and 610 illustrated in FIGS. 3, 4 and 5. In this respect, the bubble generation devices and vortex generation zones, vortex generation walls and fluid mixture separation process function in a similar manner in each of the illustrated embodiments. Due to the similarities of each these separation devices 210, 410 and 610, like components of each of the separation devices 210, 410 and 610 shown in FIGS. 3, 4 and 5 have been assigned the same reference numerals plus 200, 400 and 600 respectively where applicable.

Referring now to FIG. 3, there is shown a separation apparatus 210 according to a second preferred embodiment of the present invention. Like the separation apparatus shown in FIG. 1, this separation apparatus 210 includes a separation vessel 212 and a bubble generation device 214. An optional mixing device 252 is also provided to mix the gas enriched recycle fluid into the inlet fluid mixture 250. The apparatus 210 essentially functions as described in relation to the apparatus 10 illustrated in FIG. 1.

Again, the separation vessel 212 is a vertically orientated cylindrical vessel having planar side walls 216, a curved upper wall 218. However, in this embodiment, the base 312A of the vortex generation wall 312 forms part of the bottom wall 220 of the vessel 212. Therefore, when compared to the separation vessel 10 shown in FIG. 1, this separation vessel 210 does not include a lower compartment 44. In contrast, the first fluid inlet 321 and central elongate pipe 320 are fluidly connected via fluid line 321A to an external surge tank (not illustrated) and/or oil collection vessel (not illustrated).

Referring now to FIG. 4, there is shown a separation apparatus 410 according to a third preferred embodiment of the present invention. Like the separation apparatus shown in FIGS. 1 and 3, this separation apparatus 410 includes a separation vessel 412 and a bubble generation device 414. Again, an optional mixing device 452 is also provided to mix the gas enriched recycle fluid into the inlet fluid mixture 450. The apparatus 410 essentially functions as described in relation to the apparatus 10, 210 illustrated in FIGS. 1 and 3.

Again, the separation vessel 412 is a vertically orientated cylindrical vessel having planar side walls 416, a curved upper wall 418. Like the vessel 212 shown in FIG. 3, the base 512A of the vortex generation wall 512 is part of the bottom wall 420 of the vessel 412.

The first fluid outlet 521 also has a different configuration to the outlets of the separation vessels illustrated in FIGS. 1 and 3. In this embodiment, the first fluid outlet 521 comprises an annular chamber 520 which annularly extends around the inside of the sidewall 416 of the vessel 412. The inlet is level with the upper surface 509 of the fluid reservoir 507 and receives the less dense component in the same manner as the first fluid outlet 21 described in relation to the vessel 12 illustrated in FIG. 1. The annular chamber 520 can be fluidly connected via fluid line 521A to an external surge tank (not illustrated) and/or oil collection vessel (not illustrated).

Referring now to FIG. 5, there is shown a separation apparatus 610 according to a fourth preferred embodiment of the present invention. Like the separation apparatus shown in FIGS. 1, 3 and 4, this separation apparatus 610 includes a separation vessel 612 and a bubble generation device 614. An optional mixing device 652 is also provided to mix the gas enriched recycle fluid into the inlet fluid mixture 650. The apparatus 610 essentially functions as described in relation to the apparatus 10, 210, 410 illustrated in FIGS. 1, 3 and 4.

Again, the separation vessel 612 is a vertically orientated cylindrical vessel having planar side walls 616, a curved upper wall 618. Like the vessel 212 shown in FIG. 3, the base 712A of the vortex generation wall 712 is part of the bottom wall 620 of the vessel 612. Again, the first fluid outlet 721 also has a different configuration to the outlet of the separation vessels illustrated in FIGS. 1, 3 and 4. In this embodiment, the first fluid outlet 721 comprises a conical trough 720 into which the less dense fluid can spill. The inlet of the trough 720 is level with the upper surface 709 of the fluid reservoir 707 and receives the less dense component in the same manner as the first fluid outlet 21 described in relation to the vessel 12 illustrated in FIG. 1. The trough 720 can be fluidly connected via fluid line 721A to an external surge tank (not illustrated) and/or oil collection vessel (not illustrated).

It should be understood that various control systems may be utilized to control the operation of vessels 12, 212, 412 and 612, and that these can be incorporated by a person skilled in the art as a matter of routine.

Those skilled in the art will appreciate that the invention described herein is susceptible to variations and modifications other than those specifically described. It is understood that the invention includes all such variations and modifications which fall within the spirit and scope of the present invention.

Where the terms "comprise", "comprises", "comprised" or "comprising" are used in this specification (including the claims) they are to be interpreted as specifying the presence of the stated features, integers, steps or components, but not precluding the presence of one or more other feature, integer, step, component or group thereof.

We claim:

1. A fluid separation apparatus for separating a fluid mixture including at least two fluids having different densities, the apparatus comprising:
   a vessel having:
      a fluid reservoir;
      a vortex generation zone located within the fluid reservoir of the vessel, the vortex generation zone including a vortex generation wall having at least a first tapered wall section having an angle which increases the rotational velocity of a fluid mixture flowing through the vortex generation zone, the vortex generation zone having a configuration which directs the fluid mixture from the fluid inlet toward the upper surface of the fluid reservoir;
      at least one fluid inlet for the fluid mixture, the fluid inlet extending into the vortex generation zone at an angle having a component tangential to an internal wall of the vortex generation wall at a point on the internal wall proximate to the fluid inlet;
      a first fluid outlet through which the less dense fluid exits the vessel, the first fluid outlet being fluidly connected to the fluid reservoir, the first fluid outlet being positioned substantially level with an upper surface of the fluid reservoir; and
      a second fluid outlet through which the denser fluid exits the vessel, the second fluid outlet being fluidly connected to the fluid reservoir, and
   a gas bubble generator which introduces gas bubbles into at least a portion of the fluid mixture before the fluid mixture enters the vessel through the fluid inlet, the gas bubbles assisting separation of the fluids of the fluid mixture within the fluid reservoir,
   wherein the vortex generation wall further includes a second wall section located between the first wall section and the upper surface of the fluid reservoir having an upright substantially frustoconical shape, and a third wall section located between the second wall section and the upper surface of the fluid reservoir having a substantially cylindrical shape.

2. A fluid separation apparatus according to claim 1, wherein the vessel includes a central vertical axis and the first wall section of the vortex generation wall comprises an angle from 1 to 70 degrees from a vertical axis from the vertical axis.

3. A fluid separation apparatus according to claim 2, wherein the first wall section of the vortex generation wall has an inverted substantially frustoconical shape.

4. A fluid separation apparatus according to claim 1, wherein at least one section of the vortex generation wall forms at least part of the base of the fluid reservoir of the vessel.

5. A fluid separation apparatus according to claim 1, wherein the top of the vortex generation wall is located below the upper surface of the fluid reservoir.

6. A fluid separation apparatus according to claim 5, wherein the fluid inlet is located in the first wall section of the vortex generation zone.

7. A fluid separation apparatus according to claim 1, wherein the first fluid outlet includes a central receptacle having a central conduit extending from the upper surface of the fluid reservoir and through the fluid reservoir of the vessel.

8. A fluid separation apparatus according to claim 1, wherein the first fluid outlet includes an annular chamber extending substantially around the inner side of the vessel.

9. A fluid separation apparatus according to claim 1, wherein the second fluid outlet is located outside of the vortex generation zone of the fluid reservoir.

10. A fluid separation apparatus according to claim 9, wherein the second fluid outlet is located in the fluid reservoir between the fluid inlet and the top of the vortex generation wall of the vortex generation zone.

11. A fluid separation apparatus according to claim 1, wherein the gas bubble generator introduces microbubbles into fluid fed therethrough.

12. A fluid separation apparatus to claim 1, wherein the gas bubble generator is fed a fluid from a recycle fluid stream fluidly connected to the fluid reservoir of the vessel, the gas bubble generator introducing gas bubbles into the fluid of the recycle fluid stream to produce a gas entrained fluid which is mixed with the fluid mixture being fed into the inlet of the vessel.

13. A fluid separation apparatus to claim 12, wherein the recycle fluid stream recycles between 5 to 30% of fluid from the fluid reservoir of the vessel through the gas bubble generator.

14. A fluid separation apparatus to claim 1, wherein the gas bubble generator is fluidly connected to at least one gas outlet of the vessel, thereby utilising gas from the vessel to introduce bubbles in the fluid mixture.

15. A fluid separation apparatus according to claim 1, wherein at least one section of the vortex generation wall forms a fluid seal with an inner wall of the vessel defining an upper chamber and a lower chamber within the vessel separated by the vortex generation wall.

16. A fluid separation apparatus according to claim 15, wherein the lower chamber is fluidly separated from the fluid reservoir and in fluid communication with the fluid reservoir through the first fluid outlet.

17. A fluid separation apparatus according to claim 15, wherein the vortex generation wall further includes a second wall section located between the first wall section and the upper surface of the fluid reservoir and the peripheral section of the vortex generation wall of the vortex generation zone which forms a fluid seal with an inner wall of the vessel is located at or generally about the connection or connecting section between the first wall section and second wall section of the vortex generation wall.

18. A fluid separation apparatus according to claim 15, further including a separation zone in fluid communication with the vortex generation zone and located within the fluid reservoir of the vessel and external to the vortex generation zone.

* * * * *